Patented Feb. 12, 1952

2,585,652

UNITED STATES PATENT OFFICE 2,585,652

ANION EXCHANGE RESINS AND METHOD OF TREATING MINERAL OILS

Howard D. Hartough, Pitman, Philip D. Caesar, Wenonah, and Sigmund J. Lukasiewicz, Woodbury, N. J., assignors to Socony-Vacuum Oil Company, Incorporated, a corporation of New York No Drawing. Application February 8, 1947, Serial No. 727,300

11 Claims. (Cl. 196—23)

The present invention relates to organic materials suitable for use in anion exchange processes and, more particularly, to organic nitrogenous substances having at least one thiophene nucleus and capable of removing anions from substantially anhydrous liquids.

The practice of using zeolites and organic resinous materials for removing cations from aqueous solutions has existed for a number of years. Thus the U. S. Patent No. 2,191,853 describes the use of synthetic resins obtained by the condensation of polyhydric phenols or their derivatives or tannins alone or in association with monohydric phenols or their derivatives with formaldehyde or an equivalent methylene body to effect removal of certain cations in a base exchange process. On the other hand, the use of organic resinous ion exchange materials for removing anions or cations from organic liquids has been a much more recent development. Thus, U. S. Patent No. 2,367,803 describes a process for removing copper from petroleum oils which have been sweetened with copper containing reagents.

The method for removing copper from petroleum oils which have been sweetened with copper containing reagents comprises contacting the copper containing oil with resins prepared by condensing mono- or polyhydroxy phenols with formaldehyde in the presence of sodium sulfite, or by condensing sulfonic acids of mono- or polyhydroxy aromatic compounds with formaldehyde or by sulfonating phenol-aldehyde resins such as "Bakelite" with strong sulfuric acid to remove the copper. As a result of this treatment, acid is formed in the oil. Acid from other sources also may be present in the oil. The acid, whatever its source, is removed by contact with an anion exchange material. Suitable for this purpose are the resins resulting from the condensation of aromatic amines with formaldehyde or those prepared by condensation of aliphatic polyamines with poly-halogen derivatives of the hydrocarbon.

It has now been discovered that nitrogenous bodies containing the thiophene nucleus may be used as anion exchange materials for removing anions from organic liquids, especially from mixtures of hydrocarbons and, more particularly, from petroleum and from fractions and/or distillates thereof.

It is an object of the present invention to provide a method for preparing anion exchange resins containing the thiophene nucleus. It is another object of the present invention to provide a method for preparing anion exchange resins of nitrogeneous character, containing the thiophene nucleus and having a molecular weight of at least 500. It is a further object of the present invention to provide a method for preparing an anion exchange material comprising a mechanically stable carrier coated with an anion exchange material of nitrogenous character and containing a thiophene nucleus, said anion exchange material having a molecular weight of at least 500.

Briefly, the novel anion exchange materials are prepared by reacting thiophene or derivatives thereof with formaldehyde or its polymers in the presence of ammonia, primary amines or polyamines such as ethylene diamine or urea, as the acid salts, for example hydrochlorides. The anion exchange materials are also prepared by reacting thiophene or derivatives thereof with hexamethylenetetramine in the presence of hydrochloric acid. The resinous bodies so obtained in the water- or alcohol-soluble form may be absorbed on a mechanically stable carrier and precipitated on the carrier by treatment with an aqueous or alcoholic solution of a base such as caustic soda, lime, soda ash, ammonia, etc. It will be appreciated that gaseous ammonia as well as solutions thereof may be used as a precipitant. The base with the precipitated ion exchange material is washed and dried at elevated temperatures. In the latter operation the resinous material is baked on the carrier. Preferably the carrier is in the form of particles of a suitable size, say larger than 60 mesh but not larger than about 2 to 4 mesh. After baking at elevated temperatures of about 100 degrees centigrade to about 225 degrees centigrade the resinic adherescence of the carrier particles is insoluble in most organic solvents, has a convenient particle size and good mechanical stability.

Another method for producing a suitable ion exchange material of novel character comprises precipitating the nitrogenous material having at least two thiophene nuclei from a solution thereof by the addition to the solution of a base as enumerated hereinbefore, water washing the precipitated resin, and working on a conventional rubber mill at temperatures above about 120 degrees centigrade but below that at which the material decomposes. The set resin is then broken up and screened to the desired particle size, say plus 4 to 6 mesh. The resin is then insoluble in most organic solvents and has good ion exchange activity.

The novel resinous ion exchange materials are prepared as described in the copending application for United States Letters Patent Serial No. 636,511, filed December 21, 1945, now abandoned, and a continuation-in-part thereof, Serial No. 204,264, filed January 3, 1951 in the names of two of us; to wit: Howard D. Hartough and Sigmund J. Lukasiewicz. A division thereof, Serial No. 725,100, filed January 29, 1947, is now U. S. Patent No. 2,497,067. As pointed out in the afore-identified copending application, the reaction of thiophene and/or its derivatives having a stable electropositive substituent group or groups other than the unstable hydroxyl or amino groups with ammonium halide and formaldehyde or its polymers or hexamethylenetetramine at temperatures below 100 degrees centigrade (212 degrees Fahrenheit) for periods of time up to several hours produces sub-resinous bodies in greater or lesser amount dependent upon the mole ratio of the reactants. When the ammonium halide is in excess of 1 mole per mole of thiophene the amount of sub-resinous material is least. When either the thiophene or formaldehyde or its polymers is equal to or in excess of a 1:2:1 ratio ammonium halide the amount of sub-resinous material increases. Accordingly, it is preferred that the reactants thiophene and/or derivatives as defined hereinbefore, formaldehyde (as defined hereinbefore) and ammonium halide are reacted in a molal proportion such that the amount of formaldehyde is greater than 1 mole of formaldehyde for each mole of thiophene. However, it is to be observed that the molecular weight of the sub-resinous product varies with the mole ratio of thiophene and formaldehyde, the higher molecular weight products being obtained when an excess of formaldehyde is employed.

These sub-resinous bodies are insoluble in alcohol, ether, chloroform and mineral oil and soluble in benzene and dioxane. The sub-resinous products are obtained by removing excess thiophene by steam distillation or otherwise and topping under a vacuum the residual oil to about 200 degrees centigrade at a pressure of about 7 millimeters of mercury.

The polymeric amines obtained by the reaction of one of the group thiophene and thiophenes having stable electropositive substituent groups, and formaldehyde or its polymers and ammonia or substituted ammonia have compositions which may be expressed empirically by the following formula:

$$[(W)_a(Y)_b(Z)_c(OH)_d]_n(HX)_c$$

Amine III where
- W = one of the group thiophene and thiophenes having stable electropositive substituent groups attached to the nucleus,
- Y = methylene group,
- Z = nitrogen,
- (OH) = part of molecule reacting with acetic anhydride as in the A. S. T. M. method for determining hydroxyl numbers,
- HX = a hydrohalide (chloride, bromide or iodide)
- a = small whole number, 1 to 4,
- b = small whole number, 2 to 16,
- c = small whole number, 1 to 4,
- d = small whole number, 1 to 4, and
- n = number of units in the polymer.

The free amines can be obtained from the hydrohalides by standard procedures, for example, by treatment of the hydrochlorides with aqueous caustic followed by extraction with benzene from a saturated salt solution. The polymeric amines decompose at temperatures exceeding 200 to 210 degrees centigrade with loss of water.

It is to be noted that analyses of the polymeric amine and the chemical properties thereof indicate that it is a polymeric amine containing several units of the $C_4H_3S \cdot CH_2-N=$ type. It is not a tri-(2-thenyl)amine because the sulfur content is too low while the nitrogen content and the molecular weight are too high for the tri-thenyl amine although it is likely that tertiary amines of a polymeric nature are present.

Amine III (the polymeric amine) is a weakly basic amine that can be freed of its hydrochloride by neutralization with sodium acetate. Amines I and II cannot be so freed. This characteristic indicates that amine III contains tertiary amine groupings. The presence of active hydrogen is evidenced by the fact that amine III gives a relatively high hydroxyl number. An explanation for this can be found in presuming that amine III contains the following grouping:

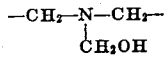

or

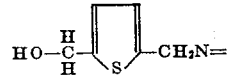

Materials known to contain these groupings readily lose water and polymerize to form resinous bodies. Decomposition of resin III by heat results in the formation of resinous products with the liberation of water.

The formaldehyde to be used in this reaction may be in the form of an aqueous solution such as the conventional aqueous solution containing 36 to 40 per cent formaldehyde, known commercially as Formalin, or in the form of paraformaldehyde or trioxane. When polymeric forms of formaldehyde are used, it has been found advantageous to add a small amount, say a few milliliters of water or of an acid per mole of formaldehyde. The acid to be used is one with a dissociation constant of about $10^{-4}$ or less, such as acetic acid.

Hexamethylenetetramine when mixed with thiophene and hydrochloric acid slowly added gives rise to the same reaction and the same products as are obtained by condensing thiophene, ammonium chloride and formaldehyde. Thus, hexamethylenetetramine and hydrochloric acid may be substituted for formaldehyde and ammonium chloride.

While the proportion of sub-resinous body can be kept at a minimum by reacting an amount of thiophene or ammonium halide in excess of that required for the molar ratio 1:1:1, the total yield and amount of sub-resinous amines can be increased by increasing the molar proportion of formaldehyde. This relation is demonstrated in Table I, the data for which were obtained by mixing the reactants in the molar proportions shown and refluxing the reaction mixture for three hours. The reaction mixture was then neutralized and extracted with benzene. The yield of primary and secondary amines was very low. No formation of resinous products was observed. The crude sub-resinous amines were analyzed for sulfur, nitrogen and hydroxyl group and the molecular weight determined. It is to be noted that aqueous formaldehyde was used. When aqueous formaldehyde is replaced by paraformaldehyde in these proportions only resinous materials are obtained. However, when the sub-resinous products listed in Table I are heated, hard resinous products are obtained. It is also to be noted that exposure of films of these sub-resinous amines to the air over a period of time produces a resinous hard film.

TABLE I

| Example No. | Moles of Reactants | | | Grams Yield | Sub-resinous Amines | | | |
|---|---|---|---|---|---|---|---|---|
| | C₄H₄S | Aqueous CH₂O | NH₄Cl | | Per Cent S | Per Cent N | OH No. | Molecular Weight |
| XIX | 1 | 1 | 0.5 | 59 | 20.6 | 5.65 | 285 | 725 |
| XX | 1 | 3 | 1 | 91 | 22.9 | 6.21 | 199 | 620 |
| XXI | 1 | 4 | 2 | 117 | 20.6 | 7.3 | 475 | |
| XXII | 1 | 4 | 1 | 132 | 21.2 | 8.8 | 370 | 651 |

These analyses lead to the postulation that these sub-resinous amines may be represented by the empirical formula $(C_4H_nS-(CH_2)_2N)_4(OH)_4$ where $n$ equals zero to 3. The calculated values for sulfur and nitrogen, the hydroxyl number and molecular weight based on this formula are:

Per cent sulfur_____ 19.2
Per cent nitrogen_____ 8.4
Hydroxyl No._____ 340
Molecular weight_____ 668

These values are to be compared with the observed values for the sub-resinous amines produced in Example I. The following formula may be said to represent the sub-resinous product obtained in Example II:

$$[(C_4H_nS)_3(CH_2)_9N_2(OH)_2]_{1-2}$$

where $n$ equals zero to 3.

| | Calculated for Monomer | Found |
|---|---|---|
| Per cent Sulfur | 22.0 | 22.9 |
| Per cent Nitrogen | 6.2 | 6.2 |
| Hydroxyl No. | 252 | 199 |
| Molecular Weight | 428 | 620 |

In view of the foregoing, it can then be said that the sub-resinous amines produced by the foregoing reaction are mixtures of materials having the formulas given hereinbefore.

*Example I*

Eighty-four grams (1 mole) of thiophene, 90 grams (1 mole) of paraformaldehyde (equivalent to 3 moles of formaldehyde), 54 grams (1 mole) of ammonium chloride and 20 grams of acetic acid were mixed together in a 500 milliliter 3-necked flask fitted with a mechanical stirrer, thermometer, and reflux condenser and heated to 75 degrees centigrade. Within a few minutes yellow to red coloration started and a vigorous heat of reaction set in necessitating ice bath cooling. After 15 minutes the heat of reaction subsided and the mixture was heated at 80 to 85 degrees centigrade for 2½ hours thereafter. The material was cooled, transferred to a beaker, and neutralized with 40 per cent sodium hydroxide solution. A solid yellow to brown resinous mass precipitated. This was water washed on a rubber mill and the following analyses obtained.

Per cent sulfur_____ 21.5
Per cent nitrogen_____ 6.09
Per cent residual chlorine_____ 0.31
Per cent ash_____ 1.0

*Example II*

A mixture of 84 grams (1.0 mole) of thiophene, 40 grams (1.3 moles) of paraformaldehyde, 54.0 grams (1.0 mole) of ammonium chloride and 20 grams of acetic acid were heated for three hours at 78 degrees centigrade. Unreacted thiophene was recovered by decantation. The residue was neutralized with strong potassium hydroxide solution in the presence of benzene and the neutralized residue extracted with benzene. The benzene extracts were topped to yield a residue of crude amine, the nitrogen content of which was 6.5 per cent. Distillation in vacuo to 145 degrees centigrade at 7 millimeters of mercury left a residue containing 5.8 per cent nitrogen and 28.3 per cent sulfur.

While sub-resinous nitrogenous materials as defined hereinbefore can be obtained by heating thiophene or derivatives thereof (as defined hereinbefore) with formaldehyde or polymers thereof and ammonium salts for up to 3 hours at about 75 to 80 degrees centigrade, essentially thermoplastic water-insoluble resins are obtained when thiophene or thiophene derivatives are heated for more than 3 hours with primary or secondary aliphatic amines, aliphatic polyamines such as ethylene diamine, aromatic amines such as aniline and urea. The nitrogenous bodies so produced are precipitated from aqueous solution as hydrohalides. Although the nitrogenous bodies may be precipitated from aqueous solution hydrogen halides, better yields are obtained when the resin is precipitated from aqueous solution with alkali metal hydroxide.

Essentially the same end-products are produced whether aqueous formaldehyde in the form of formalin (37 per cent aqueous formaldehyde), paraformaldehyde, or trioxane be used in this reaction. Hexamethylenetetramine and hydrogen halide acid can be substituted for formaldehyde and ammonium halide to produce essentially the same end-products.

Thiourea when used to replace urea and the other nitrogenous components of the reaction fails to produce resinous products. However, yellow oils of objectionable odors are obtained.

Other examples illustrative of the preparation of suitable resinous material are the following:

*Example III*

To a mixture of 31 grams (0.5 mole) of urea, 41 grams (0.5 mole) of formalin and 42 grams (0.5 mole) of thiophene, 50 grams (0.5 mole) of concentrated hydrochloric acid were added slowly while the mixture was cooled. A white solid precipitate formed immediately. After heating for six hours at reflux temperature only a trace of thiophene could be detected. The reaction mixture was filtered and the solid was washed with water, then with dilute caustic solution followed with two water washes. The resinous material was dried for 12 hours in a steam oven. The yield of resin as the hydrochloride salt was 93 grams.

Analysis: Sulfur 14.2 per cent; nitrogen 20.6 per cent; chlorine 5.36 per cent.

Example IV illustrates the use of alkyl and aryl polyamines.

Example IV

To 30 grams (0.5 mole) of ethylene diamine cooled in an ice bath, 200 grams (2.0 moles) of concentrated hydrochloric acid were added. To the hydrochloride salt thus formed, 84 grams (1 mole) of thiophene and 81 grams (1 mole) of aqueous 36 per cent formaldehyde were added. The reaction mixture was stirred and heated for two hours at 75 degrees centigrade. The resulting reaction mixture was filtered and washed with alcohol. The solvent and unreacted thiophene were stripped off under vacuum. The yield of resinous material was 139 grams.

Analysis: Found, sulfur 19.0 per cent; nitrogen 5.98 per cent.

Example V

A nitrogenous resin containing a thiophene nucleus was prepared by reacting about 84 parts by weight of thiophene (about 1 mole), about 90 parts by weight of trioxymethylene (about 3 moles of formaldehyde) and about 54 parts by weight of ammonium chloride (about 1 mole) and 10 parts by weight of acetic acid. (An acid having a dissociation constant of $10^{-4}$ or less or any agent capable of depolymerizing the formaldehyde polymer such as water may be used.) The resin was precipitated from the reaction solution by addition of an excess of 10 per cent potassium hydroxide. (Other bases and other concentrations thereof may be used). The resin has sufficient plasticity to be handled on a rubber mill. The resin is washed well with water, dried and polymerization completed by heating the rolls. The finished resin was characterized by the following concentration of sulfur, nitrogen and chlorine:

Sulfur 21.5 per cent; nitrogen 6.1 per cent; chlorine 0.3 per cent.

Illustrative of the use of the novel nitrogenous resinous bodies having a thiophene nucleus is the following description of the treatment of a sulfuric acid treated petroleum fraction.

The sulfuric acid treated petroleum fraction was diluted with one volume of a mixture of methyl-ethyl ketone, benzol and toluene and percolated through a bed of particles of the resin obtained as described in Example V. The charge to the percolator had a neutralization number (N. N.) of 1.73 (i. e. an acidity equivalent to 1.73 milligrams of potassium hydroxide per gram of oil). One part by weight of the resin reduced the neutralization number of 5 parts by weight of the oil to 0.17.

The percolator was drained and washed with the diluent to remove entrained charge solution and then regenerated by exposure to the action of gaseous ammonia until the adsorbed acidic materials were converted into the corresponding ammonium salts. The ammonium salts were removed from the ion exchange material by washing with a solvent therefor, i. e. methyl-ethyl ketone, benzol and toluol mixture. After removal of the ammonium salts of the acidic material 5 parts by weight of another oil sample having an N. N. of 1.68 was percolated through the regenerated ion exchange material and the N. N. reduced to 0.41.

We claim:
1. A method of preparing anion-exchange material which comprises establishing an aqueous solution of the hydrochloride nitrogenous condensation material having a thiophene nucleus, adding an amount of alkali metal hydroxide to said aqueous solution sufficient to convert said hydrochloride to the free base thereby converting the soluble hydrochloride to the water-insoluble free base, separating said free base from said aqueous solution, water-washing said separated free base and heat-converting said washed condensation material to resinous material substantially insoluble in oil, having a molecular weight of at least 500 and having anion-exchange capabilities, said sub-resinous material in the hydrochloride form having been prepared by reacting thiophene, formaldehyde and a nitrogen-containing compound selected from the group consisting of ammonia, urea and ethylene diamine in the presence of an amount of hydrogen chloride stoichiometrically equivalent to said nitrogen-containing compound.

2. A method of preparing substantially oil-insoluble anion-exchange material which comprises reacting thiophene, one of the group consisting of formaldehyde and reversible polymers of formaldehyde and one of the group urea, ammonia and ethylene diamine in the form of hydrochlorides to form a nitrogenous condensation material in the form of the hydrochloride soluble in water, separating said hydrochloride from water-insoluble material as an aqueous solution of said hydrochloride, adding sufficient alkali metal hydroxide to said aqueous solution to convert said water-soluble hydrochloride to water-insoluble free base, separating said free base from said aqueous solution, water-washing said free base, working said water-washed free base at temperatures between about 120° C. and that at which said free base decomposes until the free base is converted to substantially oil-insoluble resin, and fragmenting the substantially oil-insoluble resin.

3. A method of preparing substantially oil-insoluble anion-exchange material which comprises reacting thiophene with one of the group consisting of formaldehyde and reversible polymers of formaldehyde and one of the group consisting of hydrochlorides of urea, ammonia and diethylene diamine to obtain water-soluble condensation material in the hydrochloride form, separating said water-soluble condensation material as an aqueous solution from water-insoluble material, adding an amount of alkali metal hydroxide to said aqueous solution to convert said hydrochloride to the free base and to precipitate said free base, water-washing said precipitated free base, heating said water-washed free base at about 100° C. to about 225° C. until said free base is converted to substantially oil-insoluble resin.

4. The method of treating a sulfuric acid-treated fraction of mineral oil which comprises contacting a mineral oil fraction containing acidic constituents with a nitrogenous resinous material having a thiophene nucleus and a molecular weight of at least about 500 obtained by reacting thiophene, trioxymethylene, a depolymerizer for the trioxymethylene and ammonium halide, washing said resinous material to remove entrained mineral oil, converting the acidic constituents absorbed on said resinous material to alkaline salts thereof, washing said resinous material with a solvent for said alkaline salts to regenerate said resinous material, and contacting said regenerated resinous material with further amounts of a petroleum fraction containing acidic constituents.

5. A method of treating a sulfuric acid-treated fraction of mineral oil which comprises contacting a sulfuric acid-treated fraction of mineral oil containing acid contaminants with an anion-exchange material and separating the so-treated mineral oil fraction from the anion-exchange material, said anion-exchange material having been obtained by reacting thiophene with one of the group consisting of hexamethylenetetramine and a combination of (1) at least one of the group consisting of formaldehyde and reversible polymers thereof and (2) ammonia in the presence of an amount of hydrogen halide at least equivalent to the stoichiometric equivalent of the nitrogen containing reactant and recovering a resinous anion-exchange material.

6. A method of treating a sulfuric acid-treated mineral oil fraction which comprises contacting a sulfuric acid-treated mineral oil fraction containing acidic contaminants with an anion-exchange material, and separating the so-treated mineral oil fraction from said anion-exchange material, said anion-exchange material having been obtained by reacting thiophene with one of the group consisting of hexamethylenetetramine and a combination of (1) at least one of the group consisting of formaldehyde and reversible polymers thereof and (2) at least one of the group consisting of urea, ammonia, and ethylene diamine in the presence of an amount of hydrogen halide equivalent to the stoichiometric equivalent of the nitrogen-containing reactant and separating a resinous condensation product.

7. The process as set forth and described in claim 6 wherein the anion exchange material is obtained by reacting urea, formaldehyde and thiophene in the molal proportion of 1:1:1 in the presence of hydrogen chloride in the proportion of one mole to one mole of urea at reflux temperature until only a trace of thiophene can be detected and recovering the condensation product of the reaction.

8. The method of treating a sulfuric acid treated fraction of mineral oil which comprises contacting a mineral oil fraction containing acidic constituents with a nitrogenous resinous material having a molecular weight of at least about 500, washing said resinous material to remove entrained mineral oil, converting the acidic constituents absorbed on said resinous material to alkaline salts thereof, washing said resinous material with a solvent for said alkaline salts to regenerate said resinous material, and contacting said regenerated resinous material with further amounts of a petroleum fraction containing acidic constituents, said resinous material having been obtained by reacting thiophene, and a reversible polymer of formaldehyde, a depolymerizer for said polymer of formaldehyde and ammonium halide.

9. The method of treating a fraction of mineral oil to remove acidic constituents resulting from a refining treatment which comprises contacting a mineral oil fraction containing acidic components resulting from a refining treatment with a nitrogenous resinous material having a molecular weight of at least about 500, removing entrained mineral oil from said resinous material, regenerating said resinous material, and contacting said regenerated resinous material with further amounts of a mineral oil fraction containing acidic constituents, said resinous material having been obtained by reacting thiophene, and a reversible polymer of formaldehyde, a depolymerizer for said polymer of formaldehyde, and ammonium chloride.

10. A method of treating a fraction of mineral oil containing acidic constituents resulting from a refining operation which comprises contacting a fraction of mineral oil containing acidic constituents resulting from a refining operation with anion-exchange material, and separating the so-treated fraction of mineral oil from the aforesaid anion-exchange material, said anion-exchange material having been obtained by reacting thiophene with one of the group consisting of hexamethylenetetramine and a combination of (1) at least one of the group consisting of formaldehyde and reversible polymers of formaldehyde and (2) at least one nitrogen-containing compound selected from the group urea, ammonia and ethylene diamine in the presence of an amount of hydrogen halide, the stoichiometric equivalent of said nitrogen compound, recovering a resinous anion-exchange material, and converting said anion-exchange material into substantially oil-insoluble anion-exchange material.

11. A method of treating a mineral oil fraction containing acidic constituents resulting from a refining operation which comprises contacting a mineral oil fraction containing acidic constituents resulting from a refining operation with a nitrogenous resinous material having a molecular weight of at least about 500, and separating the treated mineral oil from said resinous material, said resinous material having been obtained by reacting thiophene, a reversible polymer of formaldehyde, a depolymerizer for said polymer of formaldehyde and ammonium chloride.

HOWARD D. HARTOUGH.
PHILIP D. CAESAR.
SIGMUND J. LUKASIEWICZ.

REFERENCES CITED

The following references are of record in the file of this patent:

UNITED STATES PATENTS

| Number | Name | Date |
|---|---|---|
| 2,114,121 | Bender | Apr. 12, 1938 |
| 2,341,329 | Myers | Feb. 8, 1944 |
| 2,367,803 | Schindler | Jan. 23, 1945 |
| 2,453,085 | Caesar | Nov. 2, 1948 |
| 2,453,086 | Caesar | Nov. 2, 1948 |
| 2,497,067 | Hartough | Feb. 14, 1950 |
| 2,501,602 | Hartough et al. | Mar. 21, 1950 |

FOREIGN PATENTS

| Number | Country | Date |
|---|---|---|
| 109,201 | Australia | Nov. 24, 1939 |
| 51,629 | Netherlands | Dec. 15, 1941 |

OTHER REFERENCES

Hartough, Jour. Amer. Chem. Soc., vol. 68, pages 1389–1390 (July 1946).